(12) United States Patent
Chilakamarri et al.

(10) Patent No.: US 10,635,729 B2
(45) Date of Patent: Apr. 28, 2020

(54) RESEARCH APPLICATION AND SERVICE

(71) Applicant: Microsoft Technology Licensing, LLC, Redmond, WA (US)

(72) Inventors: Pradeep Chilakamarri, Seattle, WA (US); Julianne Marie Emmons, Redmond, WA (US); Douglas Maxwell Taylor, Kirkland, WA (US); Bernhard S. J. Kohlmeier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 345 days.

(21) Appl. No.: 15/639,383

(22) Filed: Jun. 30, 2017

(65) Prior Publication Data

US 2018/0032613 A1 Feb. 1, 2018

Related U.S. Application Data

(60) Provisional application No. 62/367,108, filed on Jul. 26, 2016.

(51) Int. Cl.
*G06F 16/951* (2019.01)
*G06F 16/28* (2019.01)
(Continued)

(52) U.S. Cl.
CPC ...... *G06F 16/951* (2019.01); *G06F 16/24575* (2019.01); *G06F 16/285* (2019.01);
(Continued)

(58) Field of Classification Search
None
See application file for complete search history.

(56) References Cited

U.S. PATENT DOCUMENTS 8,666,961 B1 3/2014 Qureshi et al.
2005/0165742 A1 7/2005 Chin
(Continued)

FOREIGN PATENT DOCUMENTS

KR 20020006794 A 1/2002
KR 20130099896 A 9/2013

OTHER PUBLICATIONS

"Nooor Book", Retrieved on: Jul. 27, 2016 Available at: http://www.semanoor.com.sa/NooorBook.html.
(Continued)

*Primary Examiner* — Wilson Lee
(74) *Attorney, Agent, or Firm* — Talem IP Law, LLP

(57) ABSTRACT

A research application and service are provided. The research application can be a mobile application, a feature within a word processing software, or an extension of a web-browsing software, through which a user can indicate a subject of research or assignment and receive a list of research topics from which credible research sources can be searched. The application is used to browse research sources and select particular ones to a collection. The application sends the data regarding selected research sources to be stored and accessed later via the research service. When a user is subsequently in a productivity application/authoring canvas, the productivity application can access the data collected by the user. Feedback on what, if any, research sources are included in an authoring canvas is used by the research service to modify the research sources presented by the research application when the topic is next selected by that or other users.

17 Claims, 10 Drawing Sheets

(51) Int. Cl.
*G06F 16/2457* (2019.01)
*G06F 16/9032* (2019.01)
*G06F 16/903* (2019.01)
*G06Q 10/10* (2012.01)
*G06F 16/38* (2019.01)
*G09B 5/02* (2006.01)
*H04W 88/02* (2009.01)

(52) U.S. Cl.
CPC ...... *G06F 16/382* (2019.01); *G06F 16/90324* (2019.01); *G06F 16/90335* (2019.01); *G06Q 10/10* (2013.01); *G09B 5/02* (2013.01); *H04W 88/02* (2013.01)

(56) References Cited

U.S. PATENT DOCUMENTS

| | | | | |
|---|---|---|---|---|
| 2006/0095331 | A1* | 5/2006 | O'Malley | G06Q 20/20 705/22 |
| 2008/0052162 | A1* | 2/2008 | Wood | G06Q 10/109 705/14.61 |
| 2008/0052343 | A1* | 2/2008 | Wood | H04L 12/66 709/202 |
| 2011/0191417 | A1* | 8/2011 | Rathod | G06Q 30/02 709/204 |
| 2012/0284310 | A1 | 11/2012 | Yager | |
| 2013/0104028 | A1* | 4/2013 | Murray | G06F 15/0291 715/234 |
| 2013/0275413 | A1* | 10/2013 | Snir | H04L 67/2804 707/722 |
| 2014/0172832 | A1 | 6/2014 | Rollins | |
| 2014/0372405 | A1 | 12/2014 | Lee et al. | |
| 2015/0193408 | A1 | 7/2015 | Ho | |
| 2015/0331841 | A1 | 11/2015 | Antebi et al. | |
| 2016/0041961 | A1 | 2/2016 | Romney | |
| 2016/0092416 | A1 | 3/2016 | Kohlmeier et al. | |

OTHER PUBLICATIONS

"Questia: Full Feature Index", Published on: Aug. 11, 2015 Available at: https://www.questia.com/feature-index.
"Research Writer", Published on: Jul. 12, 2011 Available at: http://www.activescholar.com/researchwriter/.
"Scrivener for iPad and iPhone", Retrieved on: Jul. 27, 2016 Available at: https://www.literatureandlatte.com/scrivener_ios.php.
"Colwiz: Reference management—simplified", Retrieved on: Jul. 27, 2016 Available at: https://www.colwiz.com/.
"Citavi Supports the Entire Research Process", Retrieved on: Jul. 27, 2016 Available at: http://www.citavi.com/en/features.html.
"International Search Report and Written Opinion Issued in PCT Application No. PCT/US2017/043927", dated Sep. 20, 2017, 11 Pages.
"International Search Report and Written Opinion Issued in PCT Application No. PCT/US2017/043936", dated Sep. 20, 2017, 11 Pages.

* cited by examiner

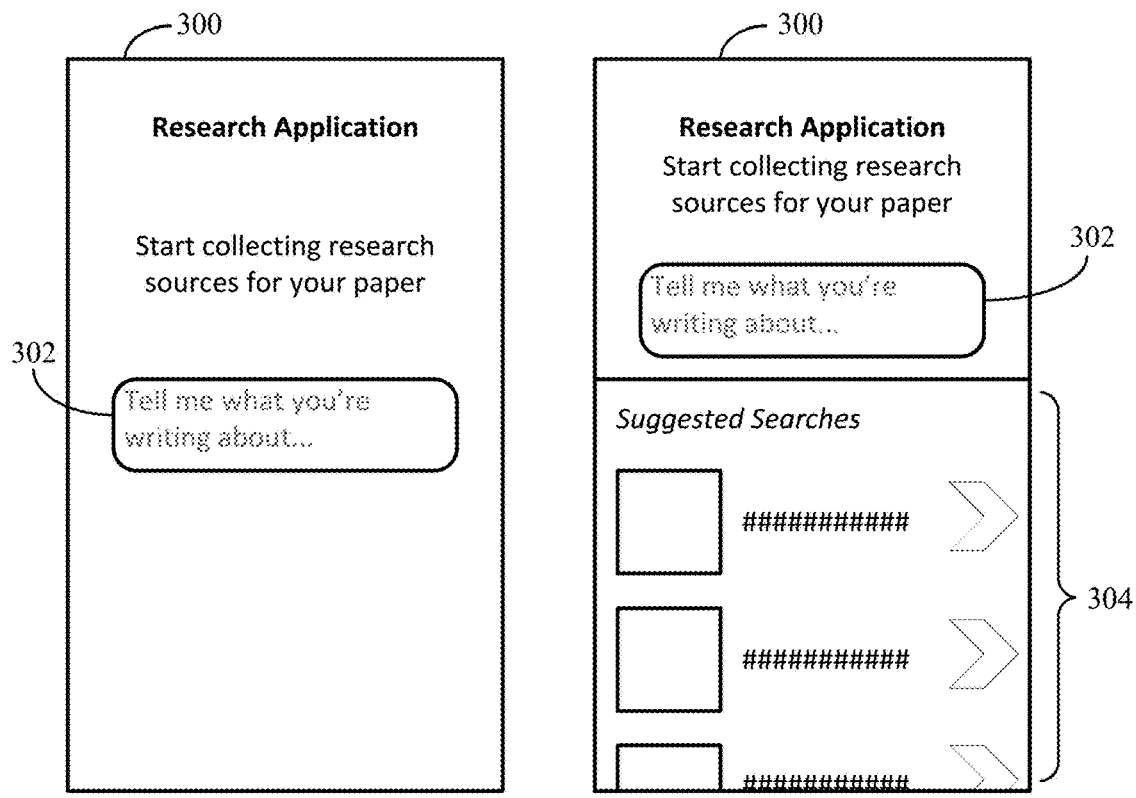
FIG. 3A  FIG. 3B
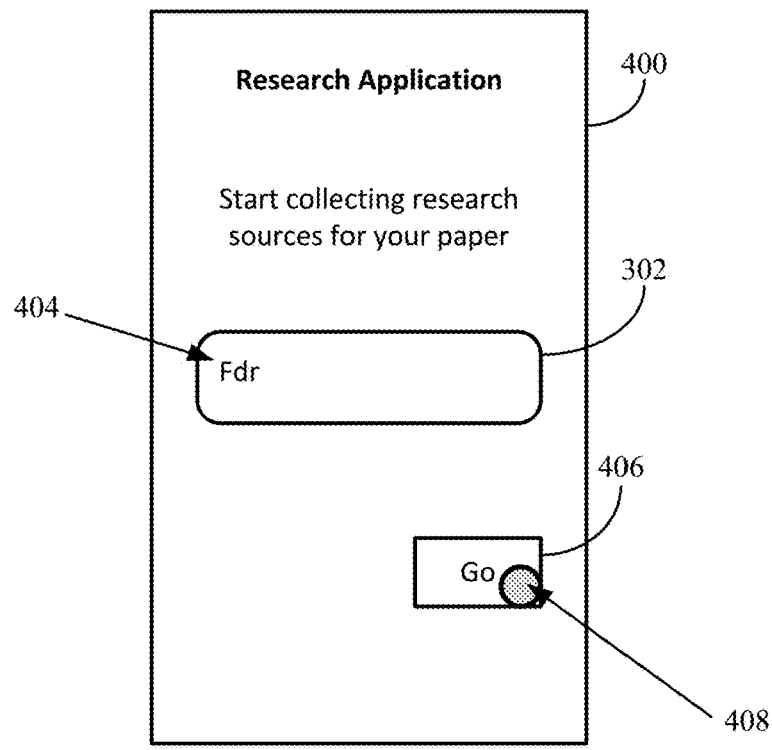
FIG. 4A

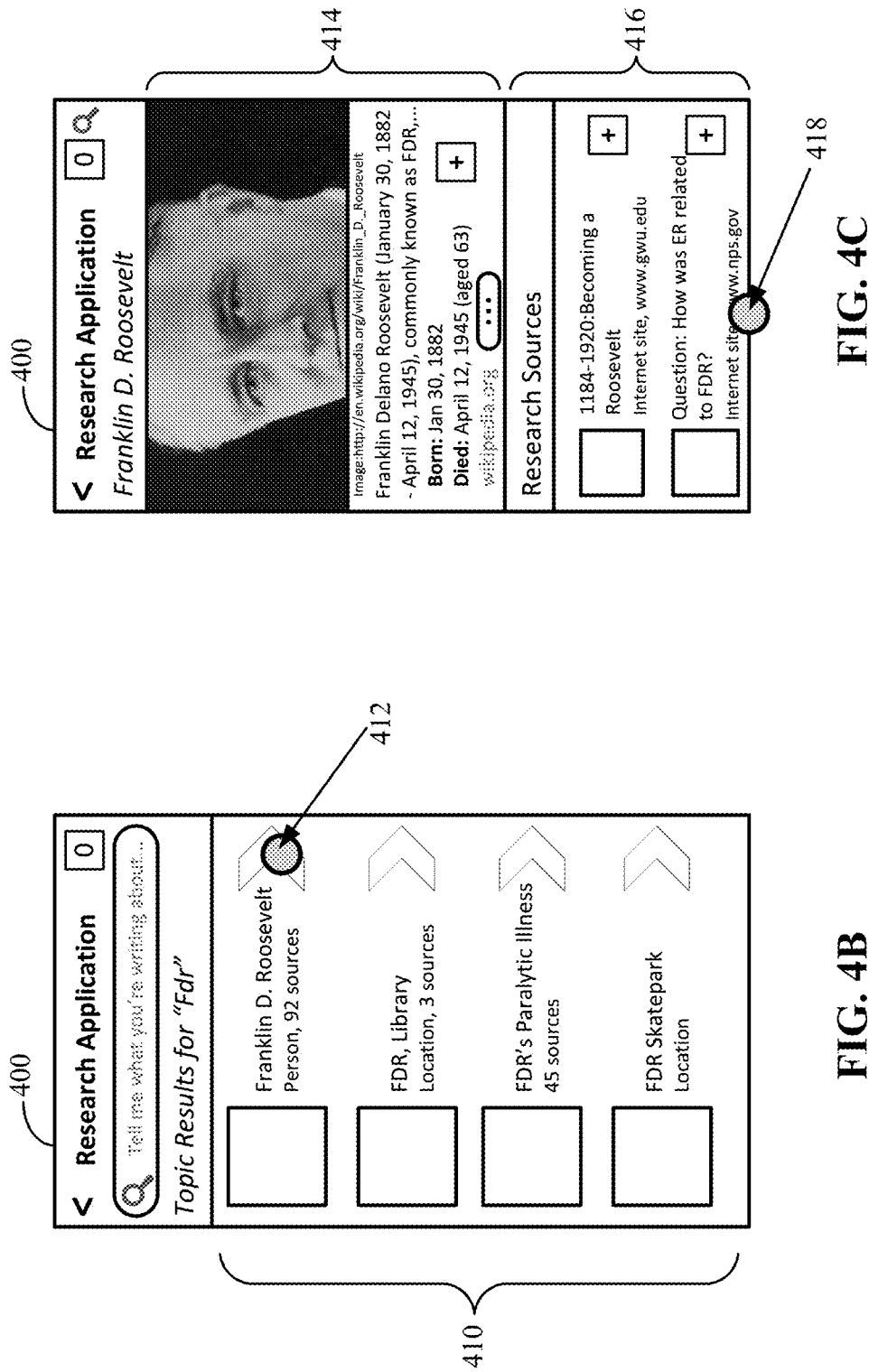

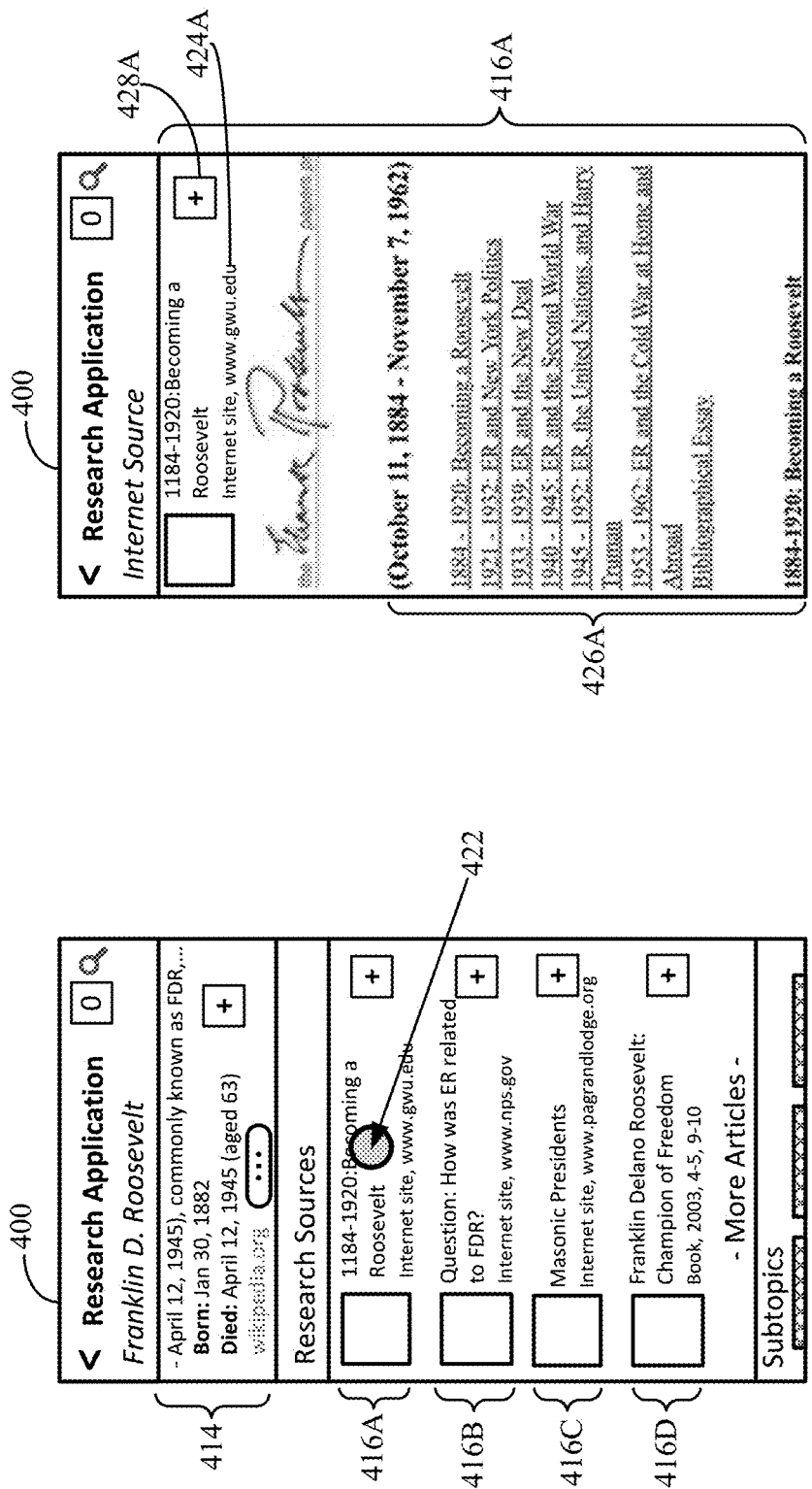

RESEARCH APPLICATION AND SERVICE

CROSS-REFERENCE TO RELATED APPLICATION

This application claims the benefit of U.S. Provisional Patent Application Ser. No. 62/367,108, filed Jul. 26, 2016.

BACKGROUND

The authoring process can be challenging. The process of authoring academic or other content can include conducting research as part of preparing to author the content. Sometimes, the subject of research is known and other times a general assignment or idea is given and a topic for the research needs to be selected. When conducting research on a selected topic, the sources of information need to be identified, sorted, analyzed, and cited. Research is often conducted separately from the writing and can involve online and physical resources. In addition to finding the time to work on a research project, it can be challenging to identify a subject of research and the right terms/language to use in the research of a topic. It can also be challenging when conducting research as part of a group project.

BRIEF SUMMARY

A research application and service are provided. The research application can be a mobile application through which a user can indicate a subject of research or assignment and receive a list of topics for which the system can provide credible primary research sources vetted by a community. The application is used to browse research sources and select particular ones to add to a collection. The application sends the data regarding selected research sources to be stored and accessed later via the service. When a user is subsequently in a productivity application/authoring canvas, the productivity application can access the data collected by the user. Feedback on what, if any, research sources are included in an authoring canvas is used by the service to modify the research sources presented by the research application when the topic is next selected by that or other users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3A-3B, 4A-4J, and 5A-5D illustrate snapshots of an example graphical user interface of a research application.

DETAILED DESCRIPTION

A research application and service are described. The application and service provide research tools particularly suitable for mobile devices as well as integrable with content authoring applications. In some cases, the application and service can enable users to search for and be served relevant content quicker. Extensive searching for content can be avoided and instead more time and resources can be spent on using identified content for creating new content. For example, the described research application can help students to write well-researched school papers, faster and easier than before. Not only can the described research application and service support mobile research, but certain embodiments can further direct a user's attention to the physical world and physical research sources, creating an online and real-world integration of research.

Through the application (whether a stand-alone or an extension), it is possible to discover credible, citable research sources on, for example, a mobile device and save the research sources with an action as easy as a single tap. The research application communicates with a research service that generates a list of relevant research sources (and corresponding information) for the research application and manages saved information (e.g., saved research sources for a particular user) from the research application. also The research application can support a document creation service from outside word processing software. The described systems and techniques enable users to conduct research and save topics, entities, reliable sources, and quotes via the service. When a user is in an authoring application (such as word processing software or other productivity application), the user can retrieve the information saved in the service. The information saved by the service is stored in a structure that enables authoring applications to understand what types of entities are being inserted into an authoring canvas via the authoring application.

Unlike a more traditional search using search engines such as BING and GOOGLE, the research application can serve content to a user in topic categories and focus on consumption experiences rather than the search experiences (of successive queries). The user is provided with research-focused results that are grouped by topic as opposed to simply ranked by a search engine algorithm based on advertisements, clicks (e.g., how often a link is selected), links (e.g., how many other sites link to a page), and keywords. Furthermore, in some implementations, the content/source itself can primarily be from a smaller corpus of credible vetted sources. Advantageously, instead of simply identifying popular content to view, the corpus of credible content can be pulled from content that is actually used in documents.

Figure 1:
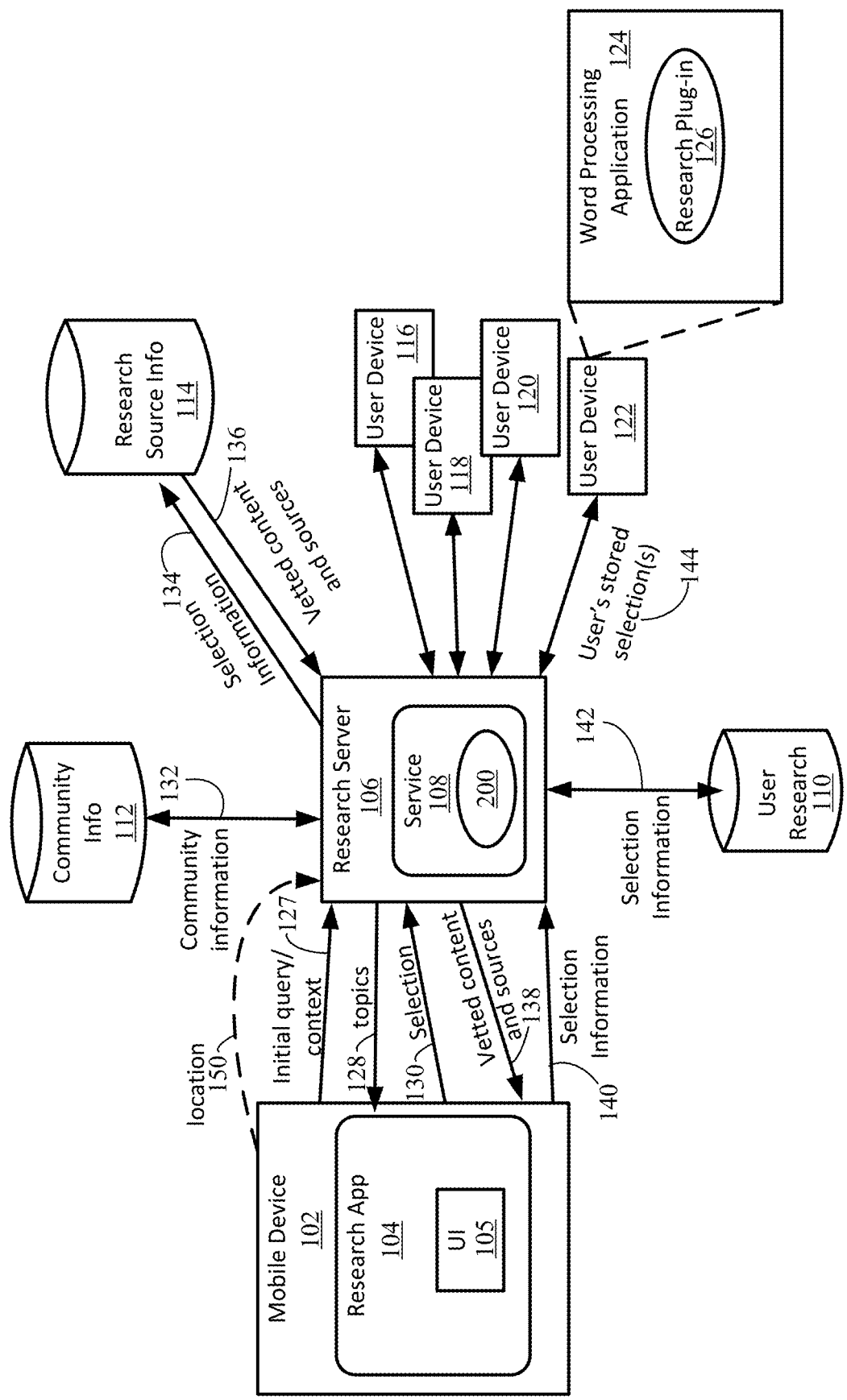
FIG. 1 illustrates an example operating environment of a research application and service.

FIG. 1 illustrates an example operating environment of a research application and service.

Referring to FIG. 1, the example operating environment may include a mobile device 102 running a research application 104 with a research application user interface (UI) 105, a research server 106 implementing a research service 108, and one or more structured resources, such as user research data resource 110, community information data resource 112, and research source information data resource 114, each of which may store data sets. The example operating environment may also include user devices, such as user device 116, user device 118, user device 120, and user device 122. The user devices can be any computing device such as, but not limited to, a laptop computer, a desktop computer, a tablet, a personal digital assistant, a smart phone, a smart television, a gaming console, a wearable device, and the like.

The example operating environment allows multiple users to access the research server 106 and users' research content via research application 104 or other applications running on user devices, such as user device 116, user device 118, and user device 120. Additionally, a user may access the research server 106 when using a word processing application 124 with a research plug-in or browser extension 126 running on a user device, such as user device 122. The browser extension may be available separate from a word processing application, and instead be an extension of web-browsing software like GOOGLE CHROME or MICROSOFT EDGE, or as a website where this functionality can be accessed.

The user research data resource 110 may contain structured data identifying selection information for a user, such as a selected source, a citation for the selected source, as well as a user identifier for the research application 104. In some cases, the selection information received for a user can be stored in a research collection associated with the user identifier. The user may publish the research collection, making the research collection available to the public. The user may control access to the collection by permissions and/or sharing functionality. In some cases, context information can be stored with a selection. The context information can be information about the user and/or user device including, but not limited to characteristics such as user location, age or grade, user group, school course/class, and language. Other context information can include class assignment, school, district and/or business entity.

The community information data resource 112 may include information from a community of users. This "community information" can include frequency data related to research (e.g., a number of times certain sources and content is accessed, stored, etc.). The community information may be used to determine popularity and/or relevancy of a source, snippet, topic, etc. The community information can include certain user information, when granted permission by the user, obtained from context information or directly from user input. For example, user identification may not be stored with community information, but characteristics such as user location, age or grade, language, and more can be stored as part of the community information and may be used to group and categorize information. For example, popularity of a particular piece of content may be identified from frequency data related to research for users in a particular geographical location or of a particular age (or age range). Community information may include subsets of the entire community. For example, communities can be public or closed for projects. Some communities can be permanent groupings and others may be project-specific (and even dissolve after a project or a period of time).

Further, research conducted via the research application 104 and relationships between entities and/or users associated with the research can be persisted by the authoring application 104 (directly or via the research service 108). The research application 104 can enable users to work together with others (e.g., collaborate with a community of known and/or unknown users). Shared spaces can be provided for a workgroup or even a larger community of users. The research service 108 (or associated service) can create/build a graph over time of topic, entity, citable sources, and quotations and share back to the community; making the process of doing research easier—providing collaborative functionality and persisting the data (e.g., in research source information data resource 114 and/or community information data resource 112).

In some cases, a graph structure, such as a social graph, may be used to represent relationships between people and things. The graph structure may be implemented in any system with users that can be identified within the system and have the relationships between them identified. In some cases, the graph structure may be included in the community information data resource 112. In other cases, the graph structure may be a separate resource. Although some of the described techniques take advantage of graph structures, other data structures may be used.

The various data resources (including user research data resource 110) can be implemented with compliance storage at the research server 106 back end (storage that complies with requirements to maintain user data as private). The research server 106 can also include functionality supporting authentication, publication, voting mechanisms, and analytics. Authentication can enable access to private content (e.g., research sources) as well as track usage of content by the associated user or others with permissions to that content. Regarding publication, the research service 106 can both manage individual accounts in a private manner and allow users to share collections of data regarding research sources in a public and semi-public space.

Regarding voting mechanisms and analytics, the research service 108 can facilitate the identification of what is being used and what is useful. The voting mechanism can be "voting through action". For example, if one user ("original user") saves a quote via the research application 104 and then subsequently uses the quote stored in a collection associated with their account (when in an authoring application, such as word processing application 124), the quote gets a "point". If someone also reuses that quote while having access to the research sources in the original user's collection, the quote gets a point, and the original user gets a point. A quote with a number of points satisfying certain criterion may be considered credible. Similarly, research sources saved by a user with a number of points satisfying certain criterion may also be considered more credible. This information can be saved, for example, in the community information data resource 112.

The research sources are identified as credible through a number of mechanisms, including those mentioned briefly above (e.g., use by a community of users). Credible sources are those that contain content most helpful to a user's work by being accurate (to the extent expected—considering, for example, perspective and knowledge of the author) and relevant to the topic of interest. According to certain implementations, a credible resource is one that is used by at least a certain number of people and/or those with a relationship to the user (e.g., a peer, a student in the same class, or a colleague in the user's organization). Users can accrue points (and gain credibility) when their research sources (e.g., the ones stored in published collections) are used by others. A scoring system may be applied by the research service 108. Vetted sources tend to be credible sources. That is, when a source has been subject to vetting by review and/or use by a trusted party or parties (and/or people with a relationship to the user as mentioned above), it can be considered credible. Examples of providers of vetted sources include Wikipedia online encyclopedia, the Stanford Encyclopedia of Philosophy, Library research guides and databases, and legal database providers.

The research source information data resource 114 may include data structures in which vetted content is stored with citations to a source of the vetted content. The research source information data resource 114 may store a knowledge graph. A knowledge graph refers to a knowledge base that is used by a search engine, such as BING from MICROSOFT or GOOGLE, to enhance the search engine's search result with semantic-search information that is gathered from a wide variety of sources. This information can be used by the research application to provide some description to the user when listing the topics that may be relevant to the user's research.

Although the user research data resource 110, the community information data resource 112, and the research source information data resource 114 are shown in FIG. 1 as three separate storage resources, these resources may each be made up of multiple storage resources and even across multiple data centers. In addition, the resources may be shared resources such that data from one or more of the described resources may be stored on a same physical or virtual machine. For example, in some implementations, the user research data resource 110 and the community information data resource 112 may be shared storage resources managed by a single entity. Similarly, the community information data resource 112 and the research source information data resource 114 may be shared storage resource(s) managed by a single entity. Of course, other combinations in whole or in part may be implemented.

The research application 104, at the mobile device 102, communicates with the research service 108 at research server 106. In addition, the research plug-in or browser extension 126, included in the word processing application 124 at user device 122, communicates with the research service 108. The research service 108 can communicate with the research source information data resource 114 of vetted content, the user research data resource 110, and the community information data resource 112 to support requests of the research application 104 and the research plug-in or browser extension 126.

Components (computing systems, storage resources, and the like) in the operating environment may operate on or in communication with each other over a network (not shown). The network can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

Communication to and from the components may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Figure 2:
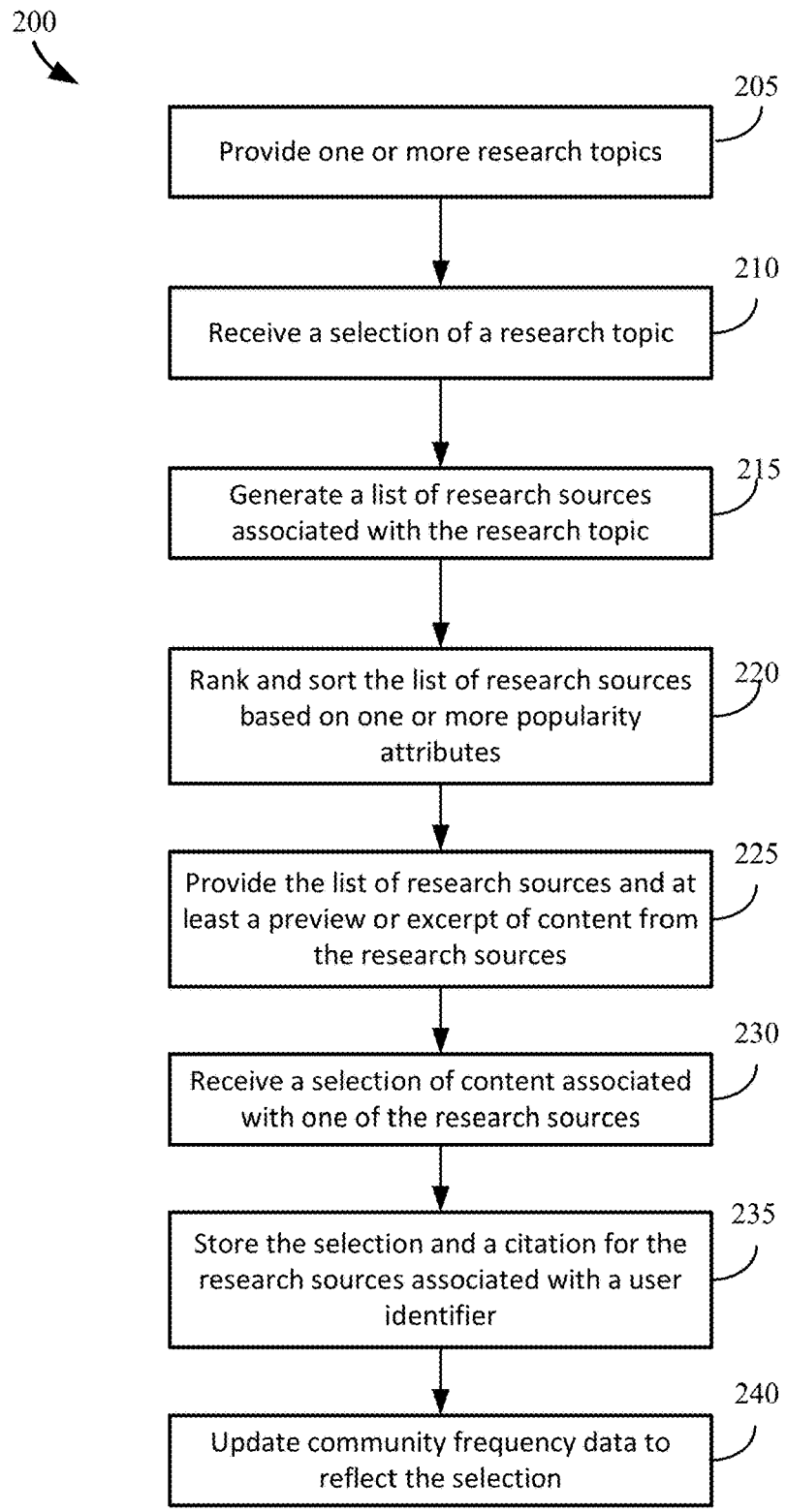
FIG. 2 illustrates an example process flow for supporting mobile research.

FIG. 2 illustrates an example process flow for supporting mobile research. Referring to both FIG. 1 and FIG. 2, the research service 108, performing process 200 described with respect to FIG. 2, can be implemented by a research server 106, which can be embodied as described with respect to computing system 700 as shown in FIG. 7 and even, in whole or in part, by computing system 600 as described with respect to FIG. 6. Referring to FIG. 2, a list of topics 128 can be provided (205) to a research application 104. A topic is a distribution of words that can correspond to an aspect of an entity (and sometimes the entity itself). A topic serves as a subject or category of related information. The topic of an expression (e.g., such as received in an initial query by the user of a research application) can be used for entity disambiguation (e.g., using Latent Dirichlet Allocation (LDA) and its hierarchical variants). Entity disambiguation refers to the identifying of entities from text and their labeling with one of several entity-type labels. In some cases, WIKIPEDIA may be used as a comprehensive reference catalog for large-scale entity disambiguation. In other cases, other public and/or private corpuses can be used to facilitate the entity disambiguation.

In some implementations, the research service 108 may first receive a research query 127 input by a user of the research application 104. In some cases, the research query 127 sent from the research application 104 may also contain context information such as user group and/or location (e.g., location information 150). For example, context of a work group for collaboration (e.g., a subset or set of students of a class) can be provided by the research application 104. User group information may be provided, by the user, to the research application 104, identified by the research application 104, or inferred by the research service 108 based on other context information such as, but not limited to, one or more of user ID, location of user, and tenant information. Other context information can include document context, for example, when the user is using the researcher application from a plug-in or extension.

The research service 108 may then identify a set of possible research topics based on the research query 127, and optional context information, and provide a set of suggested research topics to the research application 104. The research topic results can be selective towards topics likely to be relevant to research for a project or paper. To this end, the research service and/or research application can rank and sort the topics by relevancy. The relevancy of the possible research topics can be determined, in part, by information about the user, including the location information of the user. The relevancy of the possible research topics can be determined, in part, by information included in the community information data resource 112.

The research service 108 can provide a set of possible research topics 128 customized to the users associated with the user identifier, the community information, such as the community frequency data, and the group for the user.

In some cases, the list of topics provided to the research application 104 may be or include a set of suggested research topics. For example, a set of possible research topics can be suggested to the user without receiving a query. In some of such cases, when the user accesses the research application 104, the research service 108 may identify a set of possible research topics based on the location information 150 of the device executing research application 104 or the user identifier of the user logged in to the research application 104. The research server 108 may use information included in the community information data resource 112 to generate the set of possible research topics.

In cases where the possible research topics are based on the user identifier of the research application 104, the possible research topics may include one or more research topics from a user history and a social graph relationship. The research service 108 may provide the set of possible research topics to the research application 104 where the set of possible research topics are displayed to the user.

The research service 108 can receive a selection 130 of a research topic (210) from a list of research topics provided to the research application 104. In some implementations, the community information 132, such as the community frequency data, in the community information data resource 112 may be updated to reflect the selection 130 of the research topic. Once the selection 130 of a research topic (210) is received, the research service 108 can then generate a list of research sources associated with the research topic (215). When generating the list, the research service 108 can use selection information 134 to query the research source information data resource 114 for research sources associated with the research topic. The selection information 134 can include the selection 130 as well as other information, such as community information 132. The list of research sources from the research source information data resource 114 can include vetted content and sources 136.

The research service 108 can rank and sort the list of research sources based, at least in part, on one or more popularity attributes (220), The popularity attributes may be based on community information (e.g., community frequency data), the user identifier for the research application 104, and the location information 150. The list of research sources may be ordered (e.g., ranked and sorted) by their usefulness (or credibility). For example, the community may have voted certain research sources to the top explicitly or implicitly (e.g., voting by action), indicating that certain research sources were most useful when writing about a topic. As mentioned above, the community information may include subsets of the entire community. Community information may be the public-at-large, a particular enterprise, a subset of people, and combinations thereof as some examples.

The ordering of the research sources provides a feedback mechanism to the user. The more times research sources are inserted, the higher those research sources would be ranked and shown as credible sources. If a user saves the research source, a vote may be counted, which can implicitly add to the credibility of the research source. Additionally, when a research source is inserted from a collection into an authoring canvas (which may not be published), a vote may be counted (and possibly weighted higher than if just saved). The community information 132 in the community information data resource 112 may be updated to reflect the vote. Voting can occur through other actions as well, for example by a user copying and pasting in text from an external website, or by including a bibliography that lists sources external to the document.

In some implementations, the research service 108 can further rank and sort the list of research sources by the location information 150 received from the research application 104. For example, in some cases the research source may be a physical research source, such as a book. Then, using the geo-location functionality of the research application 104 (e.g., by the application 104 accessing a global positioning system of the computing device 102 or other mechanism to identify physical location), the research service 108 may order the research sources so that the user may be presented with any nearby locations where the book may be purchased or borrowed, such as a book store or library.

The location information 150 may be updated and/or communicated to the service 108 at one or more times during the process such that results may change as the user travels to a different location. For example, when the research application 104 includes the functionality for geo-location, the research application 104 at the mobile device 102 can access (with permission) the user's location information 150 available, for example, from geo-location sensors at the mobile device 102 and provide that location information 150 to the research service 108. The research service 108 may pull (e.g., actively request) the location information 150 from the research application 104 or the research application 104 may push (e.g., actively report) the location information 150 to the research service 108. Further, the location information 108 may be continuously updated while the research application 104 is in use.

Once the list of research sources has been ranked and sorted (220), the research service may provide the list of research sources and at least a preview or excerpt of content from the research sources 138 to the research application 104 (225).

The research service 108 can receive selection information 140 from the research application 104 (230). The selection information may include a selection of at least some of the content associated with a research source of the list of research sources, a citation for the selected research source, as well as a user identifier for the research application 104. The research service 108 can then store selection information 142 associated with the user identifier of the research application in the user research data resource 110 (235). The selection information 142, which may include the selected content of the research source, the citation for the research source, and the user identifier, can be stored as user research in the associated user's collection. The research service can then update (240) the community information 132, such as community frequency data, in the community information data resource 112 to reflect the selection.

In some cases, the research service 108 can receive a request from the research application 104 to view collected research associated with the user identifier. The research service 108 can provide the research application 104 at least the selection and the citation for the research source of any user research stored in the user's collection in the user research data resource 110.

Additionally, the research service 108 may receive an indication that the selected content is inserted into an authoring canvas. For example, a user may interact with the user devices, such as user device 116A, running a word processing application 118 with a research plug-in 119, to access stored selections of the user 144. Further, once the research service 108 receives the indication that the selected content is inserted into an authoring canvas, the research service 108 can update the community information, such as community frequency data, to reflect the insertion of the selected content.

The user's stored selection(s) 144 can be subsequently accessed through a productivity application (word processing application 124) such as, but not limited to, MICROSOFT WORD, MICROSOFT ONENOTE, SCRIVENER by Literature & Lane, and APPLE PAGES, when the user is ready to start writing. From within the productivity application (e.g., word processing application 124), the user can view the saved research sources, easily reference the research sources in the paper, and cite the research sources automatically when the research source is selected. The productivity application (e.g., word processing application 124) accesses the saved information for inserting this information into an authoring canvas. It may even be possible to continue performing research if the productivity application (e.g., word processing application 124) supports the research functionality from the research application 104. In some cases, the productivity application (e.g., word processing application 124) can communicate to the research service 108 any new citations included the document that was not fetched from the user's research collection. Those citations can be fed into the research service 108 and counted (to possibly raise credibility of the research sources associated with those citations).

According to various implementations, research sources may be added at the back-end of the research server 106. In some cases, new research sources may arise when a WIKIPEDIA article or other source accessed by the research service 108 is updated. In some cases, users may add new research sources, for example by a contribution mechanism that the research application 104 may facilitate (e.g., taking a picture of a textbook and including that information in a collection).

In some implementations, the research service 108 can segment users into groups with commonalities. For example, a user may be grouped by grade and school district. This would facilitate the identification of research sources that were most included by other users in that group. A feed may even be provided to show research sources collected by other users in the group. In some cases, the research application 104 can utilize the geo-location function to identify when people in a user's group (or other individuals who have granted permission to indicate their position information) are conducting research via the research application 104 nearby. In some cases, research sources of particular users (inside or outside a particular group) may be available in the topic overview or available from a navigation pane as an option. It may be possible to indicate the number of users performing the same research and/or the number of users who have added a particular research source to their collection (over all time or over a segment of time).

Certain information may be provided (with user permission) from the productivity application (e.g., word processing application 124) and/or other software application to the research service 108 including, but not limited to, topic, length, writing structure (e.g., report, essay, presentation, argument, chronological, whether page numbers are included, bibliography is included, section headers, etc.), due date, existing knowledge, status for section (e.g., what needs work, what has not been done yet, how do things fit together), and collaboration structure of an assignment for which the user is using the research application 104. The research service 108 may add labels to content or content to labels based on the information provided.

According to certain embodiments, the research service 108 can include a component that provides a personalized view of the topics based on what a user indicated was important. That is, the research application 104 communicates with the research service 108 to indicate selections of the user and the research service 108 stores the selections in a collection associated with the user's account, which can be subsequently accessed by other software applications (e.g., a productivity application). When the user selected a research source, it was saved to a collection, which is a personalized view of the topics. The research service 108 can provide productivity applications, for example via application programming interfaces, access to the collection and connect any selected citations (and data relevant thereto) to the document (the deliverable/file that the user is authoring content in). The productivity application (e.g., word processing application 124) can call the research service 108 so that the research service 108 links the data that is tied to a personal profile (e.g., as part of a graph) to the document that is the container for where prose may go. For example, by signing in to MICROSOFT WORD with a particular identity, the user can fetch their collection and insert stored information into their document.

Not only can the described research application 104 and the research service 108 support mobile research (e.g., on the go and on a mobile device) and inclusion of captured content found from online sources, but certain embodiments can further direct a user's attention to the physical world and/or bring the physical world to the user. Additional features and functionality can be provided for a user through including the contextual information with requests from the research application 104 to the research service 108.

The research service 108 can use the location information 150 for notifications of research used to suggest real-world content, for example, location of physical resources. In addition, the location information 150 can be used to identify the existence of school assignments, for example, because multiple people from the same location are doing similar research. The research service 108 can also use the location information 150 to determine that the user is currently in an ideal location to perform research and send a notification or reminder to perform research to the research application 104, which can then display the notification to the user in UI 105. For example, if the research service 108 determines the user is riding a city bus (e.g., by using data collected from one or more mobile devices and/or by user-specific information of tracked routes such as available using SIRI or CORTANA personal digital assistants), the user can be notified that it may be an ideal time to perform research because the user will have 20 minutes of available time.

FIGS. 3A-3B, 4A-4J, and 5A-5D illustrate snapshots of an example graphical user interface of a research application. Referring to FIGS. 3A and 3B, a user may open a graphical user interface (GUI) 300 of a research application on their computing device. The computing device can be any computing device such as, but not limited to, a laptop computer, a desktop computer, a tablet, a personal digital assistant, a smart phone, a smart television, a gaming console, a wearable device, and the like.

In some cases, the user may first be asked to sign in to the research application (not shown). Once the user signs into the research application, the research application may ask the user to provide additional information, such as the user's grade in school, school the user attends, and district the user attends, as well as any class members of the user or other group members working on a project with the user.

Through the GUI 300, the user may be able to browse suggested searches or input their own search query. In some cases, an input field 302 for a natural language input can be provided through which a user can make a request to the research application and/or express some form of intent for using the research application. The input field 302 can represent an interface for keyed, gestural, or audio input. The input field 302 asks for a description of what a user wants to write about. The input field 302 can receive an input (e.g., words or pictures/images) via a typing keyboard, a touch keyboard or display, a motion gesture, a touch gesture, a stylus (e.g., "inking"), head, eye and gaze tracking, brain activity, or voice input as examples. A user may even be able to copy and paste an actual course assignment. The assignment could be "write an essay about the impact of FDR's economic policies on post-war America including a focus on the following three themes . . . "

Although specific implementations are described with respect to graphical user interfaces, it should be understood that natural user interface (NUI) components may be used in addition to or in place of graphical user interface components. In some cases, the input field 302 can attempt to predict the text being input and/or further include a drop down menu of options for quick selection.

In other cases, as previously described, the user may be presented with a variety of suggested searches 304 to choose from. The suggested searches may be based on the location information of the mobile device.

As shown in the example of FIG. 4A, a user may enter a topic by inputting that they are writing about "FDR" (404) into the input field 302 included in GUI 400. The user may then select a submit command (408), such as go command 406. The research application identifies the entity/entities from the input either directly or via the research service (that the research application passes the input to). At the research service, the identified entity/entities can be used to identify topics. The topics may be identified by searching and/or traversing a research source information data resource or a graph using the identified entity/entities. In some cases, user identity or other contextual information may facilitate the topic identification.

As shown in FIG. 4B, the research application can receive a list of topics 410 from the service (which may obtain the topics from the research source information data resource). The research application can provide a topical navigation interface, such as GUI 400. For example, a user may select (412) one of the topics provided in the list of topics 410 and the research application can direct the user to research sources providing information relevant to that topic. In the example shown in FIG. 4B, the user may select the topic "Franklin D. Roosevelt, the Person", which is shown in this example as having 92 research sources available.

Upon selection of the topic, the research application can provide an overview of the topic 414, such as shown in FIGS. 4C and 4D. FIG. 4C shows an example interface 400 in which a user can scroll (418) to view research sources 416 and add a research source by selecting an "add" icon (shown as a plus symbol). The research sources shown to the user are the ones identified by the service as being credible for the user (either specifically or in general).

The user can also, in some cases, explore details/content from a research source. For example, as shown in FIGS. 4D and 4E, a user selecting (422) the research source 416A, "1884-1920: Becoming a Roosevelt", can read content from that research source, such as content 426A. The user can also be provided with the type 424A of the research source 416A (e.g., Internet site). In some cases, content from the research source may be selected and saved as well, for example, by selecting add icon 428A. When the research application sends the content to the research service to save, the citation is included as part of the structured data and this citation can persist in a manner that when the content is later used, the citation to research source remains attached.

Figures 4F, 4G:
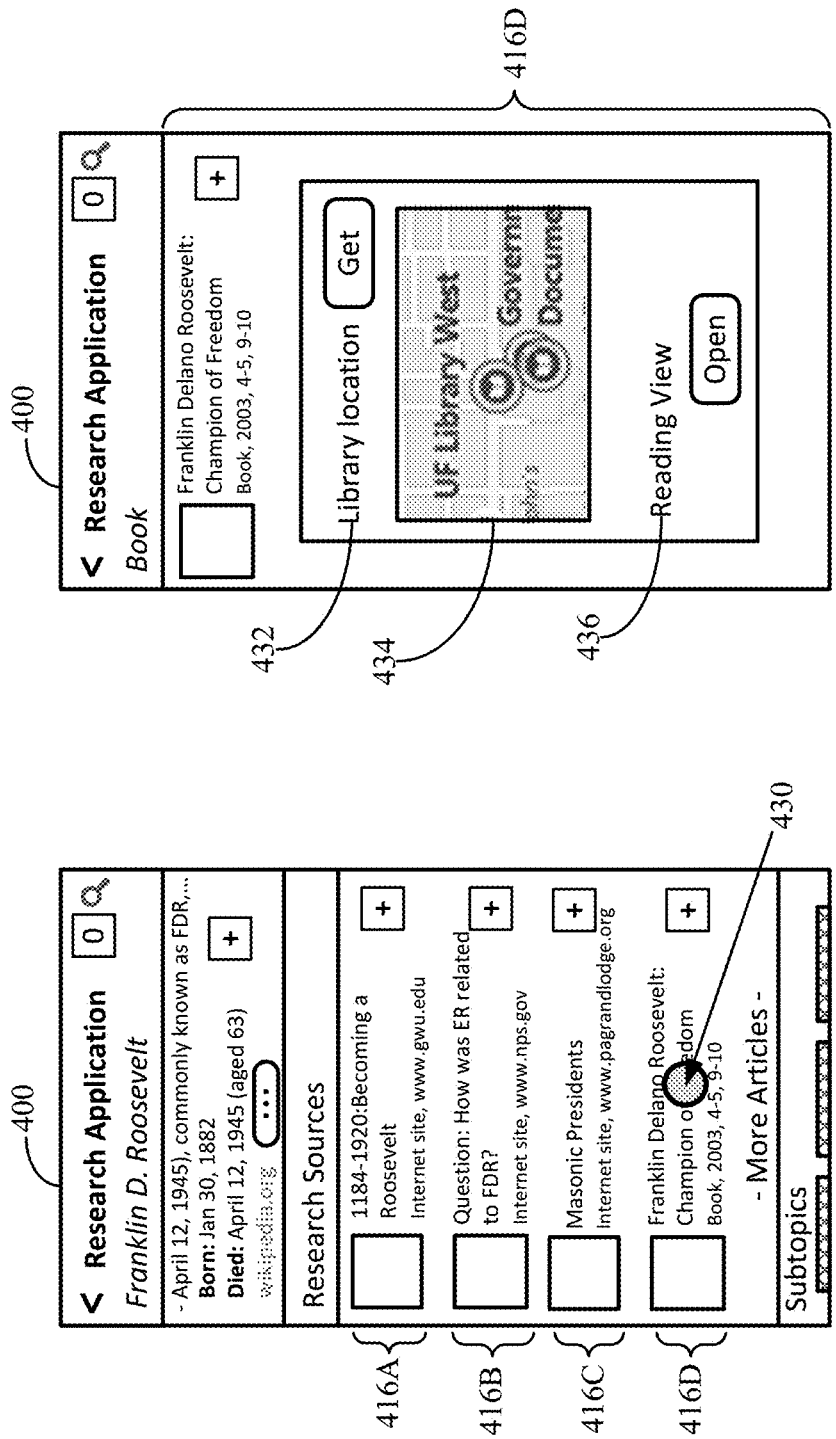

In another example, as shown in FIGS. 4F and 4G, a user selecting (430) the research source 416D, "Franklin Delano Roosevelt: Champion of Freedom", which is shown in this example as a book, can be presented with an option to get a library location 432. The research application can utilize the geo-location function to find and display a map of library locations 434 near the user's current location. Additionally, the user may be presented with an option to open a reading view 436, in which the user can view pages of content from the research source 416D.

Figure 4H:
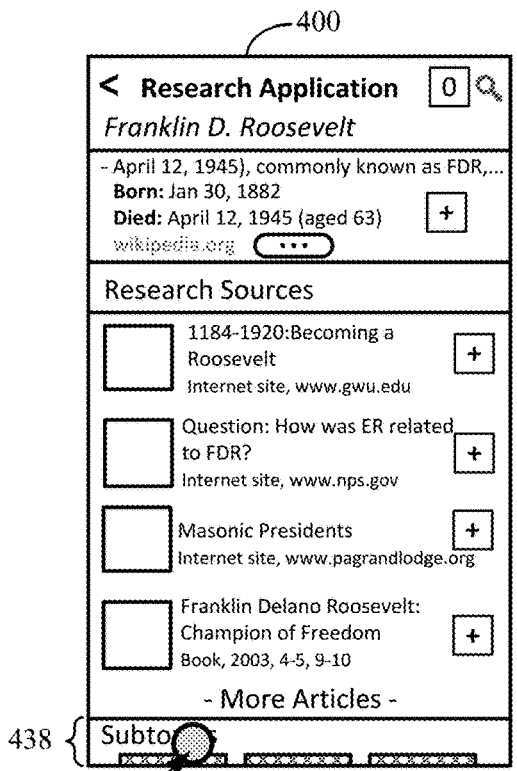
Figure 4I:
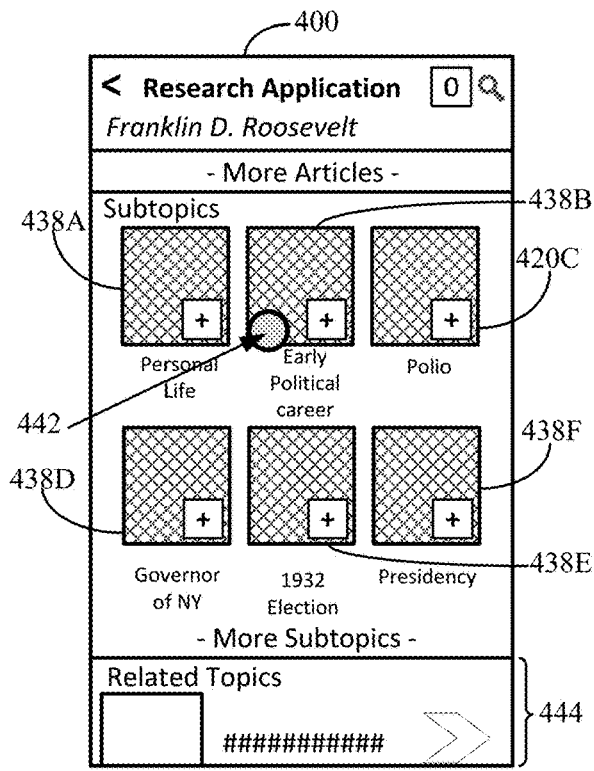
Figure 4J:
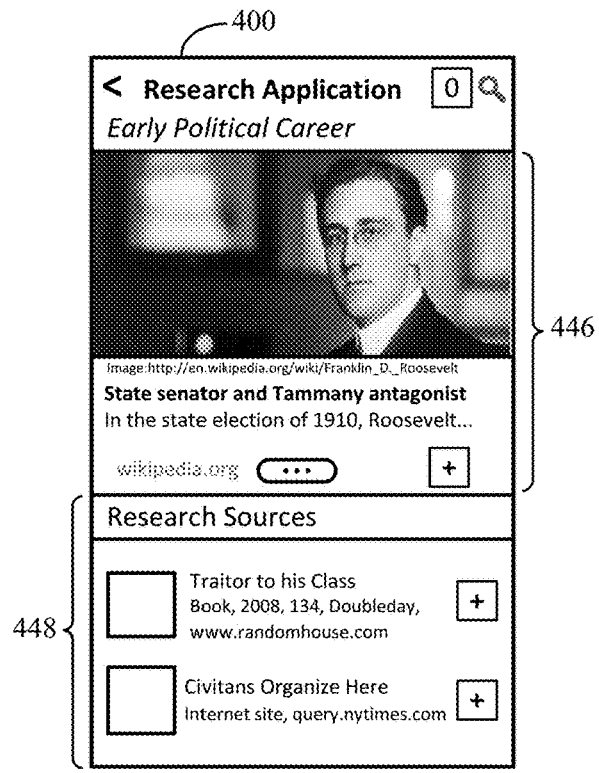

It is also possible to view (440) subtopics 438 within a research topic, as well as topics related to the research topic (related topics 444). For example, as shown in FIGS. 4H, 4I, and 4G, a user can select (442) the subtopic "Early political career" 438B and can view a subtopic view that includes a subtopic overview 446 as well as research sources 448 that can be selected.

FIGS. 5A-5D illustrate snapshots of a GUI 500 that allows a user to select research sources to save to their collection and subsequently view the selected resource sources.

Figures 5A, 5B:
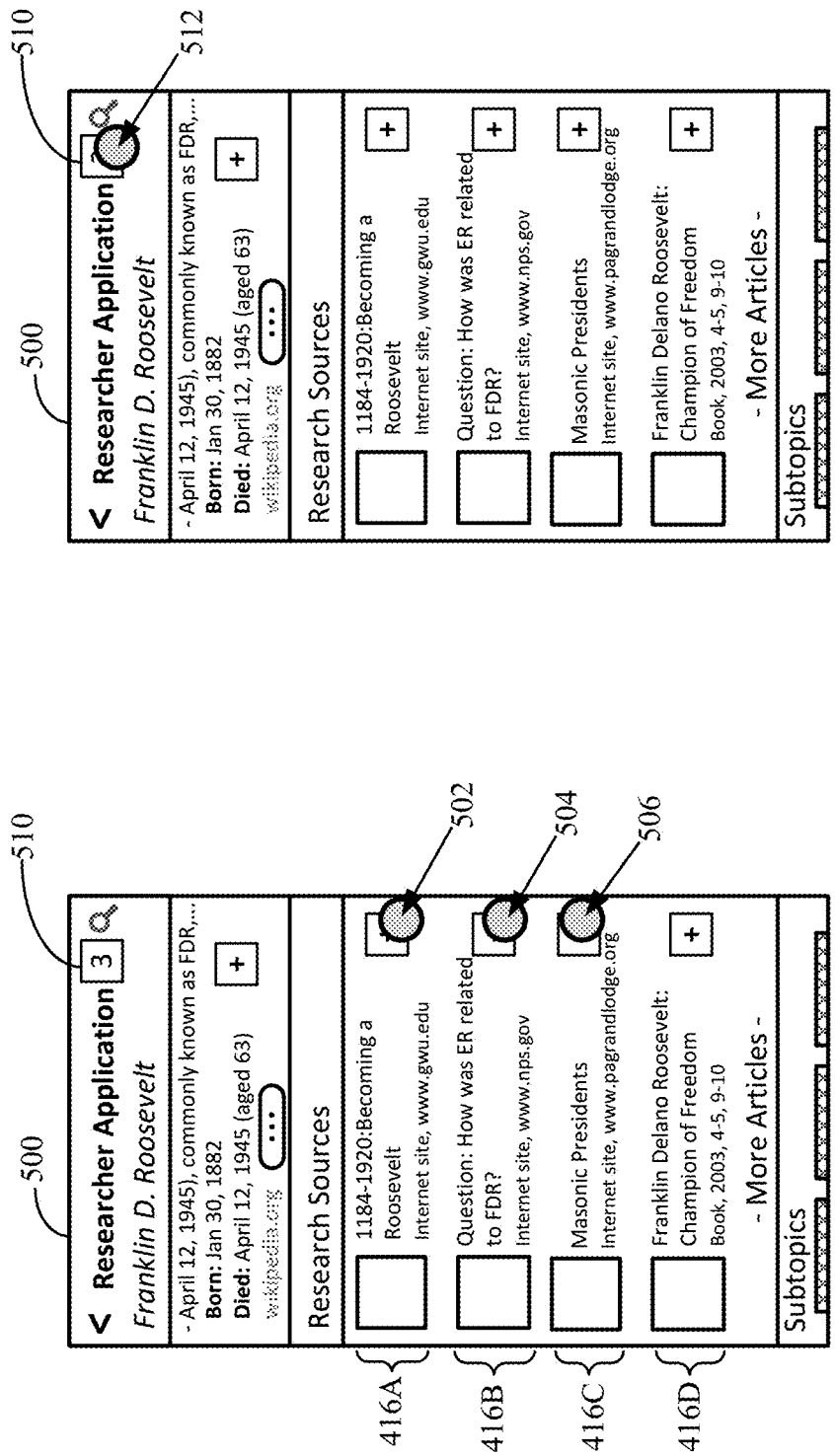

As shown in FIG. 5A, a user has selected three research sources to their account/research collection. In this example, the user has selected (502) the "1184-1920 Becoming a Roosevelt" research source 416A, which is shown in this example as an internet site with an address "www.gwu.edu". The user has also selected (504) the "Question: How was ER related to FDR?" research source 416B, which is shown in this example as an internet site with an address "www.nps.gov". Additionally, the user has selected (506) the "Masonic Presidents" research source 416C, which is shown in this example as an internet site with an address "www.pagrandlodge.org".

The total number of research sources associated with a user's account/research collection may be illustrated by a graphical representation in the list of research sources (e.g., by a darkening of a graphical icon) and/or by a number count, such as icon 510. In this example, the icon 510 displays a count of "3", for the three research sources the user has selected.

Figures 5C, 5D:
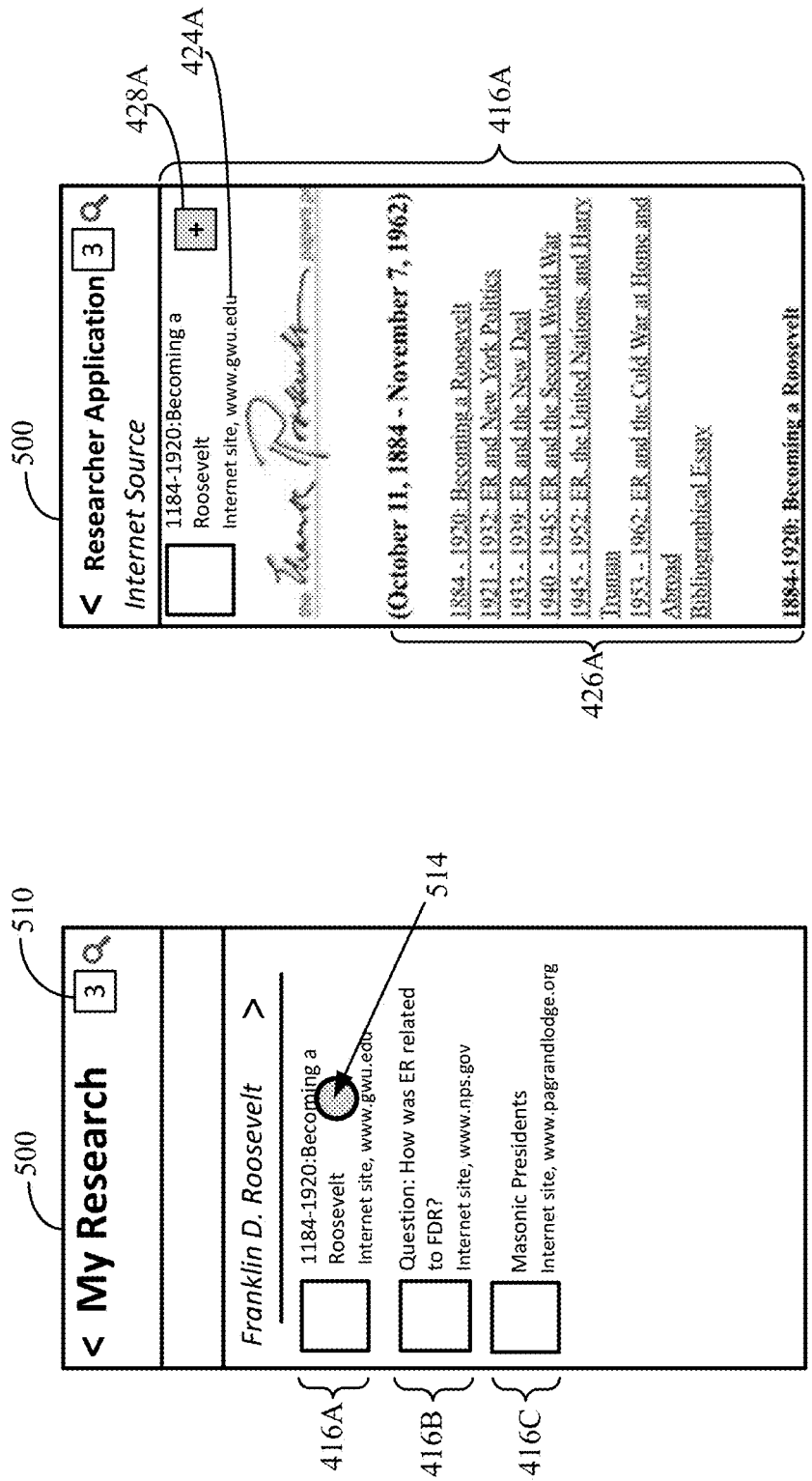

As shown in FIGS. 5B and 5C, a user can select (512) the icon 510 representing their stored research sources to view the research sources (research source 416A, research source 416B, and research source 416C) that were selected under the selected topic "Franklin D. Roosevelt" and saved to the user's research collection. Once the saved research sources are displayed on GUI 500, the user can select to view the details of any of the research sources. In this example, the user has selected (514) to view the details of the "1184-1920 Becoming a Roosevelt" research source 416A.

As shown in FIG. 5D, the details of the research source 416A have been displayed to the user. The user can view the contents 426A of the research source 416A, as well as the type (424A) of the research source 416A. It can also be seen that the add icon 428A for the research source 416A is darkened, illustrating that the research source 416A has been saved and is associated with a user's account/research collection.

Figure 6:
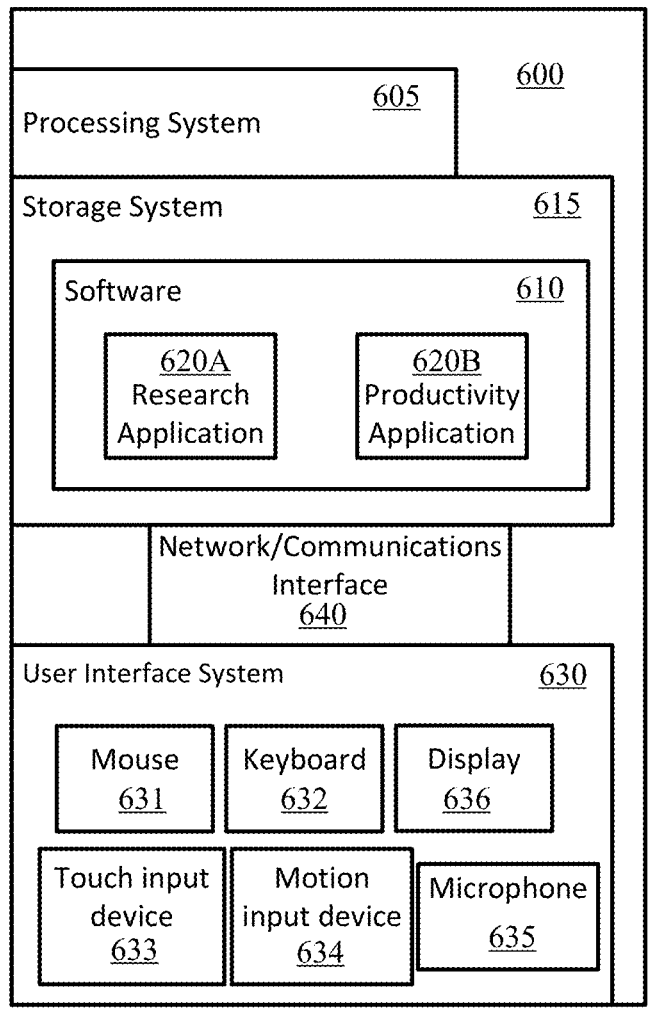
FIG. 6 illustrates components of a computing device that may be used in certain implementations described herein.
Figure 7:
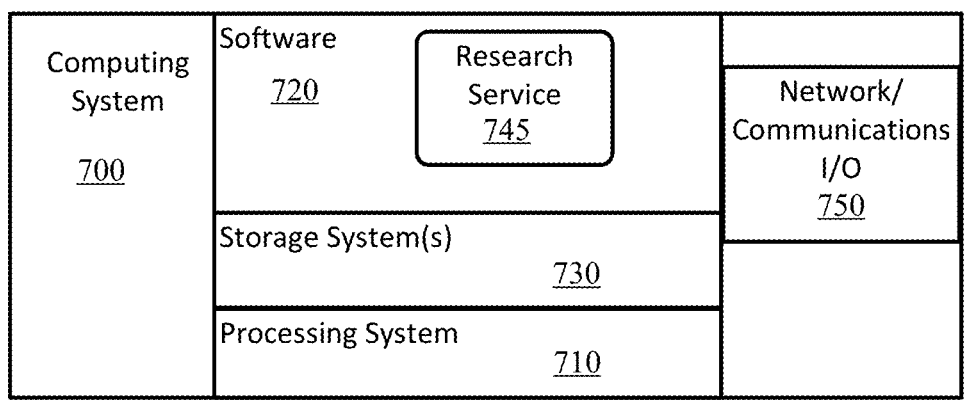
FIG. 7 illustrates components of a computing system that may be used to implement certain methods and services described herein.

FIG. 6 illustrates components of a computing device that may be used in certain implementations described herein; and FIG. 7 illustrates components of a computing system that may be used to implement certain methods and services described herein.

Referring to FIG. 6, system 600 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 600 may be incorporated to implement a particular computing device.

System 600 includes a processing system 605 of one or more processors to transform or manipulate data according to the instructions of software 610 stored on a storage system 615. Examples of processors of the processing system 605 include general purpose central processing units, graphic processing units, application specific processors, and logic devices, as well as any other type of processing device, combinations, or variations thereof. The processing system 605 may be, or is included in, a system-on-chip (SoC) along with one or more other components such as network connectivity components, sensors, video display components.

The software 610 can include an operating system and application programs such as research application 620A that a user uses to collect research sources as described herein and/or a productivity application 620B that calls the research service as described herein. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 6, can be thought of as additional, nested groupings within the operating system space, each containing an OS, application programs, and APIs.

Storage system 615 may comprise any computer readable storage media readable by the processing system 605 and capable of storing software 610 including the research application 620A and/or productivity application 620B.

Storage system 615 can include any suitable memory devices for storage of information. Examples of storage media of storage system 615 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal or carrier wave.

Storage system 615 may be implemented as a single storage device but may also be implemented across multiple storage devices or sub-systems co-located or distributed relative to each other. Storage system 615 may include additional elements, such as a controller, capable of communicating with processing system 605.

Software 610 may be implemented in program instructions and among other functions may, when executed by system 600 in general or processing system 605 in particular, direct system 600 or the one or more processors of processing system 605 to operate as described herein.

The system can further include user interface system 630, which may include input/output (I/O) devices and components that enable communication between a user and the system 600. User interface system 630 can include input devices such as a mouse 631, track pad (not shown), keyboard 632, a touch device 633 for receiving a touch gesture from a user, a motion input device 634 for detecting non-touch gestures and other motions by a user, a microphone 635, and/or other types of input devices and their associated processing elements capable of receiving user input.

The user interface system 630 may also include output devices such as display screen(s) 636, speakers (not shown), haptic devices for tactile feedback (not shown), and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display 636 in myriad ways, presenting graphical user interface elements, text, images, video, notifications, virtual buttons, virtual keyboards, or any other type of information capable of being depicted in visual form.

The user interface system 630 may also include user interface software and associated software (e.g., for graphics chips and input devices) executed by the OS in support of the various user input and output devices. The associated software assists the OS in communicating user interface hardware events to application programs using defined mechanisms. The user interface system 630 including user interface software may support a graphical user interface, a natural user interface, or any other type of user interface. For example, the interfaces for the research application described herein may be presented through user interface system 630.

Communications interface 640 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Certain aspects described herein, such as those carried out by the research service described herein may be performed on a system such as shown in FIG. 7. Referring to FIG. 7, system 700 may be implemented within a single computing device or distributed across multiple computing devices or sub-systems that cooperate in executing program instructions. The system 700 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 700 can include a processing system 710, which may include one or more processors and/or other circuitry that retrieves and executes software 720 from storage system 730. Processing system 710 may be implemented within a single processing device but may also be distributed across multiple processing devices or sub-systems that cooperate in executing program instructions.

Storage system(s) 730 can include any computer readable storage media readable by processing system 710 and capable of storing software 720. Storage system 730 may be implemented as a single storage device but may also be implemented across multiple storage devices or sub-systems co-located or distributed relative to each other. Storage system 730 may include additional elements, such as a controller, capable of communicating with processing system 710. Storage system 730 may also include storage devices and/or sub-systems on which data such as entity-related information is stored.

Software 720, including service 745, may be implemented in program instructions and among other functions may, when executed by system 700 in general or processing system 710 in particular, direct the system 700 or processing system 710 to operate as described herein for the research service (and its various components and functionality).

System 700 may represent any computing system on which software 720 may be staged and from where software 720 may be distributed, transported, downloaded, or otherwise provided to yet another computing system for deployment and execution, or yet additional distribution.

In embodiments where the system 700 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 750 may be included, providing communication connections and devices that allow for communication between system 700 and other computing systems (not shown) over a communication network or collection of networks (not shown) or the air.

Certain techniques set forth herein with respect to the research application, productivity application and/or research service may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process. It should be understood that as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter recited in the appended claims is not necessarily limited to the specific features or acts described above unless specifically disclaimed or defined. Rather, the specific features and acts described above are disclosed as examples of implementing the claims and other equivalent features and acts are intended to be within the scope of the claims.

What is claimed is:

1. A method of mobile research, the method comprising:
   receiving a selection of a research topic from a list of research topics provided to a research application on a mobile device;
   generating a list of research sources from a set of vetted research sources associated with the research topic;
   ranking and sorting the list of the research sources based at least in part on one or more of popularity according to community frequency data, a user identifier for the research application, and location information associated with the mobile device;
   providing, to the mobile device, the list of the research sources sorted by rank and at least a preview or excerpt of content from the research sources;
   receiving a selection of at least some of the content associated with a research source of the list of research sources;
   storing the selection of the at least some of the content, a citation for the research source, and the user identifier in a storage resource;
   updating the community frequency data to reflect the selection of the at least some of the content;
   receiving an indication that the selected content is inserted into an authoring canvas; and
   updating the community frequency data to reflect the insertion of the selected content.

2. The method of claim 1, further comprising:
   providing a set of suggested research topics, the set of suggested research topics being based at least in part on one or more of the user identifier or the location information.

3. The method of claim 2, wherein the suggested research topics based at least in part on the user identifier include one or more topics from at least one of user history and a social graph relationship with respect to the user identifier.

4. The method of claim 2, wherein the list of research topics provided to the research application comprise the set of suggested research topics, wherein the selection of the research topic from the list of research topics comprises a selection of one of the suggested research topics.

5. The method of claim 1, further comprising:
   receiving a request from the research application to view collected research associated with the user identifier; and providing, to the mobile device, at least the selection of the at least some of the content and the citation for the research source.

6. A system for mobile research, comprising:
a processing system;
one or more storage media;
instructions stored on at least one of the one or more storage media that, when executed by the processing system, direct the processing system to:
receive a selection of research topic from a list of research topics provided to a research application on a mobile device;
generate a list of research sources from a set of vetted research sources associated with the research topic;
rank and sort the list of the research sources based at least in part on one or more of popularity according to community frequency data, a user identifier for the research application, and location information associated with the mobile device;
provide, to the mobile device, the list of the research sources sorted by rank and at least a preview or excerpt of content from the research sources;
receive a selection of at least some of the content associated with a research source of the list of research sources;
store the selection of the at least some of the content, a citation for the research source, and the user identifier in a storage resource;
update the community frequency data to reflect the selection of the at least some of the content;
receive an indication that the selected content is inserted into an authoring canvas; and
update the community frequency data to reflect the insertion of the selected content.

7. The system of claim 6, wherein the instructions further direct the processing system to:
provide a set of suggested research topics, the set of suggested research topics being based at least in part on one or more of the user identifier or the location information.

8. The system of claim 7, wherein the suggested research topics based at least in part on the user identifier include one or more topics from at least one of user history and a social graph relationship.

9. The system of claim 7, wherein the list of research topics provided to the research application comprise the set of suggested research topics, wherein the selection of the research topic from the list of research topics comprises a selection of one of the suggested research topics.

10. The system of claim 6, wherein the instructions further direct the processing system to:
receive a request from the research application to view collected research associated with the user identifier; and
provide, to the mobile device, at least the selection of the at least some of the content and the citation for the research source.

11. One or more computer readable storage media having instructions stored thereon what when executed by a processing system direct the processing system to at least:

receive a selection of a research topic from a list of research topics provided to a research application on a mobile device;
generate a list of research sources from a set of vetted sources associated with the research topic;
rank and sort the list of the research sources based at least in part on one or more of popularity according to community frequency data, a user identifier for the research application, and location information associated with the mobile device;
provide, to the mobile device, the list of the research sources sorted by rank and at least a preview or excerpt of content from the research sources;
receive a selection of at least some of the content associated with a research source of the list of research sources;
store the selection of the at least some of the content, a citation for the research source, and the user identifier in a storage resource;
update the community frequency data to reflect the selection of the at least some of the content;
receive an indication that the selected content is inserted into an authoring canvas; and
update the community frequency data to reflect the insertion of the selected content.

12. The media of claim 11, further comprising instructions that direct the processing system to:
receive a research query input by a user of the research application on the mobile device; and
identify a list of possible research topics based on the research query.

13. The media of claim 12, wherein the research query further comprises information regarding a group for the user, wherein the instructions further direct the processing system to:
provide a set of suggested research topics customized to one or more of the user associated with the user identifier, the community frequency data, and the group for the user.

14. The media of claim 11, further comprising instructions that direct the processing system to:
in response to receiving a request for stored research comprising the user identifier, provide content stored associated with the user identifier, the content including the citation for the research source.

15. The media of claim 11, further comprising instructions that direct the processing system to:
receive a request from the research application to view collected research associated with the user identifier; and
provide, to the mobile device, at least the selection of the at least some of the content and the citation for the research source.

16. The media of claim 11, wherein the list of research sources further includes at least one subtopic.

17. The media of claim 11, wherein the list of research sources further includes at least one related research topic.

* * * * *